Figure 1:
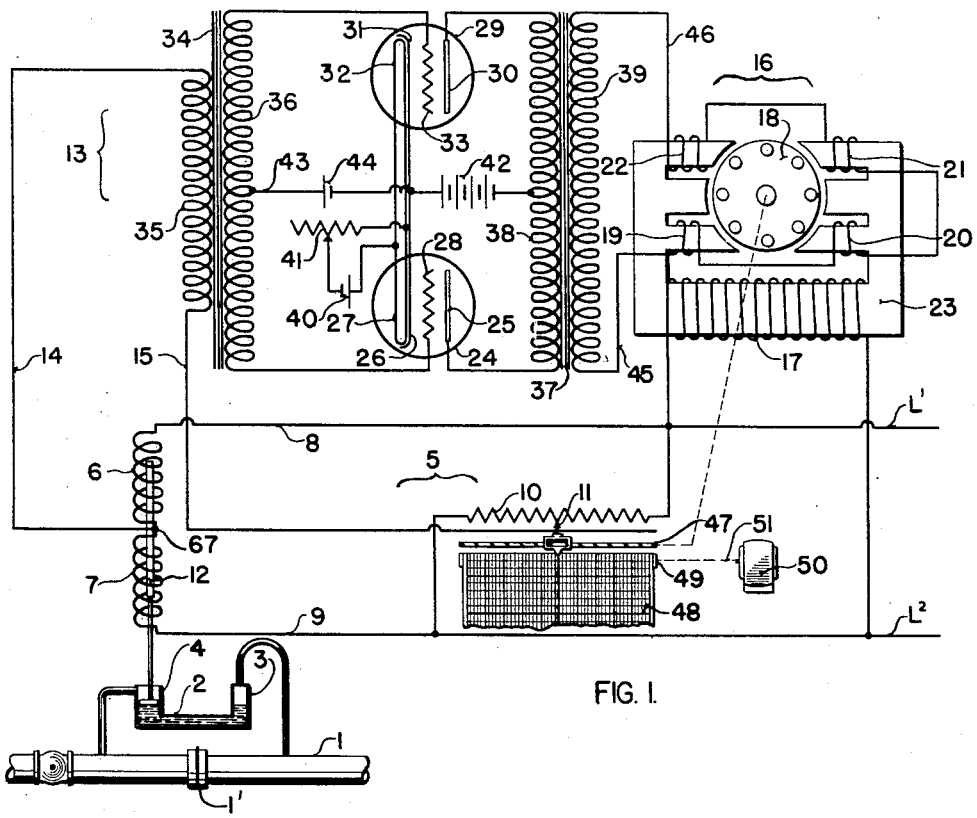

Sept. 9, 1941.    H. M. SCHMITT    2,255,601
MEASURING APPARATUS
Filed June 29, 1937

HENRY M. SCHMITT
*INVENTOR*

BY *George M. Murdaugh*
*ATTORNEY.*

Patented Sept. 9, 1941

2,255,601

UNITED STATES PATENT OFFICE 2,255,601

MEASURING APPARATUS

Henry M. Schmitt, Philadelphia, Pa., assignor to The Brown Instrument Company, Philadelphia, Pa., a corporation of Pennsylvania Application June 29, 1937, Serial No. 150,914

8 Claims. (Cl. 73—205)

The present invention relates to instrumentalities utilizing alternating current motors for positioning an indicating and/or recording element in which electronic valves are employed for selectively controlling the motor operation, and more particularly the invention relates to electronic instrumentalities for ascertaining and recording the flow of fluids, gases, or vapors in a conduit from a pressure differential which is a function of the flow.

It is a specific object of my invention to provide flow measuring apparatus which is extremely sensitive to minute changes in the flow, and in which the indicating and/or recording element is positioned under power and is adapted to continuously follow the changes in the flow.

Another object of my invention is to provide measuring apparatus of the type referred to above which may be used with equal facility for recording the variations in the flow on a circular chart or on a strip chart.

The various features of novelty which characterize my invention are pointed out with particularity in the claims annexed to and forming a part of this specification. For a better understanding of the invention, however, its advantages and objects attained with its use, reference should be had to the accompanying drawing and descriptive matter in which I have illustrated and described a preferred embodiment of my invention.

Figure 2:
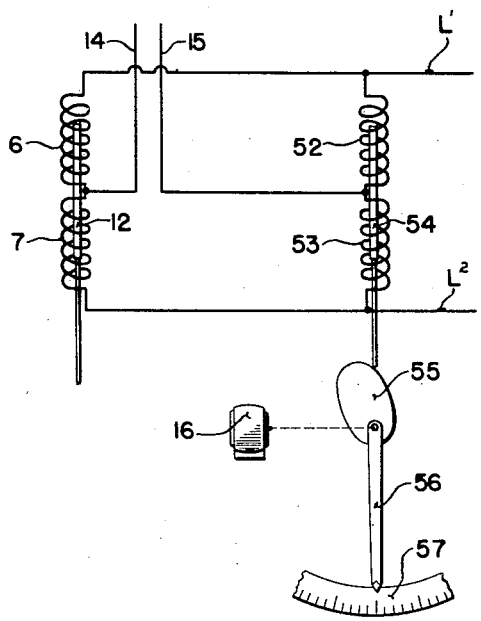

Of the drawing:

Fig. 1 is a diagrammatic illustration of one embodiment of my invention as employed in measuring the flow of fluid through a conduit; and Fig. 2 is a modification of a portion of the arrangement of Fig. 1.

Referring to Fig. 1 of the drawing an arrangement is illustrated, more or less diagrammatically, for measuring and/or recording the flow of fluid through a conduit 1. As shown the invention is adapted to flow measurement in a system including a manometer 2 having opposed legs 3 and 4, partially filled with mercury and upon the respective legs of which are impressed pressures correspondingly varying with the up and down stream pressures respectively across an orifice 1' inserted in the conduit 1. The level of the mercury in leg 4 accordingly varies with the flow in conduit 1 and I preferably measure the level variations by means including an inductance bridge network 5.

The inductance bridge network 5 includes a pair of end to end coils 6 and 7 in the transmitter which are placed one above the other, and an armature 12 carried by a float resting on the mercury in leg 4 is adapted to be moved into and out of the coils in accordance with variations in the up and down stream pressures across the orifice 1'. As the armature 12 is moved up and down the inductance of coil 6 is increased or decreased, respectively, relative to the inductance of the coil 7. The inductance bridge also includes a slidewire resistor 10 and an associated contact 11 in the receiver, which are so connected in the inductance bridge that when the movement of the armature 12 unbalances the inductance bridge by varying the inductance of the coil 6 relative to that of the coil 7, the bridge network may be rebalanced by movement of the contact 11 to the left or to the right accordingly as the movement of the armature is upward or downward, respectively. Specifically the remote ends of the resistor 10 are connected to the remote ends of the coils 6 and 7 by conductors 8 and 9 and a device later described which is adapted to respond to bridge unbalance and effect rebalancing operations, is connected between the junction 67 of coils 6 and 7 and contact 11 variable along slide wire 10.

Unbalance of the inductance bridge network 5 is detected by an electronic amplifier 13, the input terminals of which are connected by conductors 14 and 15 to the equalizing terminals 67 and 11 of the bridge, and the contact 11 is adapted to be adjusted to a new balance position along the slidewire resistor 10 by a reversible electrical motor 16 which may advantageously be selectively energized for rotation in one direction or the other by the amplifier 13.

The reversible electrical motor 16 may be of the shading pole variety having a main field 17 energized directly from the alternating current supply lines L' and L², a squirrel cage armature 18, shading fields 19, 20, 21 and 22, and a field core 23 common to all the fields. The shading fields are connected in series with the output circuit of the amplifier 13 and the motor is selectively controlled for rotation in one direction or the other by applying to these windings an alternating current voltage in phase with or 180° out of phase with the line voltage.

The main field winding 17 is energized directly from the alternating current supply lines L' and L², but is of such high inductance that the current through this winding lags the line voltage by approximately 90°. The controlling voltage impressed on the input circuit of the amplifier 13 by the bridge network 5 is substantially in phase with or 180° out of phase with the line voltage so that the voltage applied to the shading fields of motor 16 is of approximately corresponding phase. Since the inductance of the shading field windings is considerably less than that of the main field winding, the current through these windings is almost in phase with the applied voltage. Thus the magnetomotive forces set up by the main field winding and the shading field windings are displaced in space by approximately 90° so that the motor 16 is energized for rotation in one direction or the other as the voltage applied to the shading field windings is selectively controlled as to phase. That is to say, the phase relation of the amplifier output will depend on direction of bridge unbalance while the magnitude of the amplifier output current will depend on the extent of bridge unbalance.

As shown, the conductors 8 and 9, which connect the remote ends of coils 6 and 7 to the terminals of resistor 10, are connected to the alternating current supply lines L' and L², respectively, and the coils 6 and 7 are preferably so relatively wound that the two coils are energized in the same direction, that is, the magnetic lines of force simultaneously generated by the current flow through the two coils 6 and 7, pass in the same axial direction through the coil by which they are generated, so that the magnetic poles created at the remote ends of the two coils are of opposite polarity, as are the poles created at the adjacent ends of the coils.

It is noted the bridge network 5 is asymmetrical, that is, two of its arms are comprised largely of inductance and the remaining arms are comprised only of resistance, so that the bridge unbalance voltage which appears between the junction 67 and contact 11, as a result of movement of the armature 12 relative to the coils 6 and 7, may be resolved into two components, one of which is in phase with or displaced 180° in phase with the line voltage, and the other of which is approximately 90° out of phase with the line voltage. It will be apparent, however, that only the first mentioned component of the bridge unbalance voltage is effective for selectively energizing the motor 16 for rotation in one direction or the other, for when the component which is 90° out of phase with the line voltage is amplified and applied to the shading field windings of motor 16, it will set up a magnetic field in space, which is substantially in phase with or 180° out of phase with the magnetic field set up by the main field winding 17, and will therefore be ineffective for producing rotation of the rotor 18. Thus, for any normal operating position of the armature 12, relative to the coils 6 and 7, there will then be a corresponding position of the contact 11 along the resistance 10 at which that component of the bridge unbalance voltage, which is in phase with or 180° out of phase with the line voltage, will be zero, and when the contact 11 is in this position the bridge will in effect be balanced.

With the described circuit connections, when the armature 12 moves upward from a position in which the bridge network is balanced, in response to an increase in the rate of flow through the conduit 1, the inductance of the coil 6 is increased and the inductance of the coil 7 is decreased. This results in an increase in the potential drop across the coil 6 and a decrease in the potential drop across the coil 7 and thereby in the appearance of an alternating voltage between the junction 67 and the contact 11 which is substantially in phase with or 180° out of phase with the supply line voltage. The bridge may again be rebalanced by moving the contact 11 towards the left along the resistor 10 until the potential drop across the right-hand portion of the resistor is equal to that across the coil 6, and the potential drop across the left-hand portion of the resistor is equal to that across coil 7.

The amplifier 13 includes a pair of electronic valves 24 and 29 which are heater type triodes and may be contained in the same envelope, if desired, and also includes an input transformer 34, and an output transformer 37. The valve 24 includes an anode 25, a cathode 26, a heater filament 27, and a control grid 28, and the valve 29 includes an anode 30, a cathode 31, a heater filament 32, and a control grid 33. The heater filaments 27 and 32 are connected in parallel and may be energized from any suitable alternating current or direct current supply source, and as shown receive energizing current from a battery 40 through a rheostat 41 which is adjustable for varying the energizing current supplied the filaments to a desirable value. Anode voltage is supplied the valves 24 and 29 from a battery 42, the negative terminal of which is connected to the cathodes 26 and 31 which are connected together and the positive terminal thereof is connected to a center tap on the primary winding 38 of transformer 37. One end of the primary winding 38 is connected to the anode 25 of valve 24 and the other end of the winding is connected to the anode 30 of valve 29.

As shown the bridge equalizing conductors 14 and 15 are connected with the terminals of the primary winding 35 of transformer 34. One end of the secondary winding 36 is connected to the control grid 28 of valve 24 and the other end of the winding is connected to the control grid 33 of valve 29. A center tap on the secondary winding 36 is connected by a conductor 43 to the cathodes 26 and 31, and a battery 44 may be inserted in the conductor 43 for providing a bias voltage on the control grids 28 and 33.

In operation when a change occurs in the flow of fluid through the conduit 1, the pressure differential in the manometer will change, resulting in a change in the position of the armature 12 with respect to the coils 6 and 7 and thereby in unbalance of the inductance bridge network 5. The unbalanced alternating electromotive force is applied to the primary winding 35 of transformer 34 and as a result an alternating voltage of supply line frequency is applied to the control grids 28 and 33 in opposite phase so that the valves 24 and 29 are alternately rendered more conductive and less conductive, one valve being more conductive while the other valve is less conductive. The resulting pulsating current flows through the transformer primary winding 38 in successively opposite directions through the opposite halves of the transformer result in the induction of an alternating voltage of line frequency in the transformer secondary winding 39, whose phase and amplitude is determined by the direction and magnitude of the unbalanced current flows through the bridge equalizing conductors 14 and 15.

The terminals of the transformer secondary winding 39 are connected by conductors 45 and 46 to the terminals of the shading fields 19, 20, 21 and 22 which are connected in series. Diametrically opposed shading field windings 19 and 21 are connected so that voltages induced in them by the main field magnetic flux are additive and the shading field windings 20 and 22 are connected so that the voltages induced in them by the main field magnetic flux are additive and opposed to the resultant voltage induced in the shading field windings 19 and 21. Thus the resultant induced voltage across the terminals of the shading field windings connected in series is zero, and the only current which will flow through the series arrangement is that impressed thereon by the amplifier 13.

As shown, the rotor 18 of motor 16 is connected in any convenient manner to a shaft 47, which may desirably be a rod having a spiral groove thereon, and the bridge rebalancing contact 11 is mounted on a carriage carried by shaft 47 and is adapted to be moved in one direction or the other as the shaft 47 is rotated. Thus, when the motor is energized for rotation as a result of bridge unbalance, the motor effects an adjusting movement of the contact 11 along the slidewire resistor 10 in the proper direction until the bridge unbalance is reduced to zero. The motor will then come to rest with the contact 11 at a new position along the slidewire, which position will then be a measure of the flow of fluid through the conduit 1.

Desirably, a pen mounted on the carriage which carries the bridge rebalancing contact 11, is arranged to cooperate with a recorder chart 48 and to thereby provide a continuous record of the flow of fluid through the conduit 1. The recorder chart is adapted to be driven by a continuously rotating roller 49 and the latter is driven in any convenient manner, as, for example, by a unidirectional motor 50 through suitable gearing 51, so that a record of the flow of fluid through the conduit 1 will be had as a continuous line on the chart 48. It is noted that in order to cause the pen to travel the entire width of the chart the pen should be able to reach the edges of the chart without embracing the entire resistor 10. As will be readily apparent, this may conveniently be accomplished in practice by providing a spool of fixed resistance at each end of the resistor 10 and in series therewith.

In Fig. 2 I have illustrated, more or less diagrammatically, a modification of the arrangement shown in Fig. 1 in which a pair of end to end coils 52 and 53, which are preferably similar in construction to the coils 6 and 7, are employed instead of the resistor 10, and in which means have been provided for bridge circuit rebalancing in the form of an armature 54 adapted to be moved into and out of coils 52 and 53 by a motor operated cam 55. The cam 55 is connected to motor 16 through suitable gearing and the latter is arranged to be selectively energized for rotation in one direction or the other in accordance with the direction of bridge unbalance, so that as the motor is rotated in one direction or the other the cam 55 is rotated through an angle depending upon the duration of such rotation. An adjustment of the position of the armature 54 is thereby made, rebalancing the bridge circuit and deenergizing the motor 16.

For example, when the armature 12 is moved in an upward direction in response to a change in the up and down stream pressures across the orifice 1', the inductance of the coil 6 is increased and the inductance of the coil 7 is decreased thereby unbalancing the bridge, and the direction of unbalance will be such that the motor 16 will be energized for rotation in the proper direction to move the armature 54 in an upward direction until the inductances of the coils 52 and 53 are identical with the inductances of the coils 6 and 7, respectively.

It is noted that this modification is more symmetrical than the arrangement disclosed in Fig. 1, so that the ineffective component of the bridge unbalance voltage encountered in the Fig. 1 disclosure, that which is 90° out of phase with the line voltage, is balanced out. The impedances of the coils 52 and 53 are substantially identical to the impedances of the coils 6 and 7, so that the current flow through the coils 52 and 53 will be substantially in phase with the current flow through the coils 6 and 7 when the bridge is balanced, and thereby the voltage applied to the input circuit of the amplifier 13 will be zero.

It will be apparent that by suitably shaping cam 55 the angular motion of the latter required to rebalance the bridge network upon a change in the flow of fluid through the conduit 1 can be made to vary linearly with the change in the flow, and, if desired, a pointer 56 may be mounted on the cam shaft and arranged in cooperative relation with a suitably calibrated scale 57 for indicating the flow of fluid in the conduit 1. Or, if a record is desired, a pen may be mounted on the end of pointer 56 and arranged to cooperate with a circular chart, which may be rotated at a suitable speed in any convenient manner, to thereby provide a record of the variations in the flow of fluid through the conduit 1. Or, if desired the pointer may be arranged in cooperative relation with a strip chart, one of the coordinates of which may be circular, for recording the variations in the flow of fluid through the conduit 1.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. In combination, a movable controlling object, a movable controlled object, means controlled by the relative position of said objects for creating variations in electrical potential, an electron tube amplifier controlled by the variations in potential produced by said first mentioned means, and an alternating current motor having shading coils supplied with energy produced by said amplifier, for operating said controlled object.

2. Measuring apparatus comprising the combination with an inductance bridge network including an inductance which is adapted to be varied in accordance with changes in a variable condition for producing unbalanced electromotive forces in said network and an impedance adapted to be varied to reduce said unbalanced electromotive forces, means movable relatively to said impedance for varying the latter, a device controlling said last mentioned means and rigidly connected thereto, an electron tube amplifier controlled by said unbalanced electromotive forces, and an alternating current motor having shading coils supplied with energy produced by said amplifier for operating said device.

3. Measuring apparatus comprising the combination with an inductance bridge network including an inductance which is adapted to be varied in accordance with changes in a variable condition for producing unbalanced electromotive forces in said network and a resistance adapted to be varied to reduce said unbalanced electromotive forces, a device adapted to vary said resistance, an electron tube amplifier controlled by said unbalanced electromotive forces, and an alternating current motor having shading coils supplied with energy produced by said amplifier for operating said device.

4. Measuring apparatus comprising the combination with an inductance bridge network including an inductance which is adapted to be varied in accordance with changes in a variable condition for producing unbalanced electromotive forces in said network, and a second inductance adapted to be varied to reduce said unbalanced electromotive forces, a device adapted to vary said second inductance, an electron tube amplifier controlled by said unbalanced electromotive forces, and an alternating current motor having shading coils supplied with energy produced by said amplifier for operating said device.

5. Measuring apparatus comprising the combination with an inductance bridge network including a pair of end to end coils and an armature, means adapted to vary the relation of said coils and armature in accordance with changes in a variable condition for producing unbalanced electromotive forces in said network, a second pair of end to end coils connected in said network, an armature associated with said second pair of coils and adapted to be varied relatively thereto to reduce said unbalanced electromotive forces, a device adapted to vary the relation of said second pair of coils and armature, an electron tube amplifier controlled by said unbalanced electromotive forces, and an alternating current motor having shading coils supplied with energy produced by said amplifier for operating said device.

6. Measuring apparatus including in combination an inductance bridge network including a pair of end to end coils as two arms and resistances as the other two arms of said bridge network and an armature which is adapted to be moved into and out of said coils in accordance with the magnitude of the variable being measured to unbalance said bridge network, a device adapted to vary at least one of said resistances to reduce said unbalance, an electron tube amplifier controlled in accordance with the unbalance of said network, and an alternating current motor having shading coils supplied with energy produced by said amplifier for operating said device.

7. Flow measuring apparatus including in combination means for measuring a pressure differential varying according to said flow including a manometer having two interconnected legs, a sealing liquid therein subjected to said pressure and the level of which in said legs is determined thereby, a float in one of said legs, an armature adapted to be actuated by said float, an inductance bridge network including an inductance in inductive relation with said armature adapted to be varied in accordance with variations in said pressure differential to unbalance said bridge network and a second inductance adapted to be varied to rebalance said bridge network, a device adapted to vary said second mentioned inductance for rebalancing said bridge network, an electron tube amplifier controlled in accordance with the unbalance of said bridge network, and an alternating current motor having shading coils supplied with energy produced by said amplifier for controlling the actuation of said device in accordance with the magnitude of said pressure differential.

8. Flow measuring apparatus including in combination means for measuring a pressure differential varying according to said flow including a manometer having two interconnected legs, a sealing liquid therein subjected to said pressure and the level of which in said legs is determined thereby, a float in one of said legs, an inductance bridge network including a pair of end to end coils as two arms and resistances as the other two arms of said bridge network, an armature carried by said float and adapted to be moved into and out of said coils in accordance with the magnitude of said pressure differential to unbalance said bridge network, a device adapted to vary at least one of said resistances to reduce said unbalance, an electron tube amplifier controlled in accordance with the unbalance of said bridge network, and an alternating current motor having shading coils supplied with energy produced by said amplifier for controlling the actuation of said device in accordance with the magnitude of said pressure differential.

HENRY M. SCHMITT.